United States Patent
van der Lely et al.

(10) Patent No.: US 6,349,775 B1
(45) Date of Patent: Feb. 26, 2002

(54) MEANS FOR CONTROLLING A DRIVEN SOIL WORKING MACHINE ON THE BASIS OF INFORMATION DERIVED FROM A MAP

(75) Inventors: Olaf van der Lely, Zug (CH); Alexander van der Lely, Rotterdam (NL); Franciscus J. A. de Groen, Hellevoetsluis (NL); Cornelis J. G. Bom, Rozenburg (NL)

(73) Assignee: Maasland, N..V. (NL)

( * ) Notice: Subject to any disclaimer, the term of this patent is extended or adjusted under 35 U.S.C. 154(b) by 0 days.

(21) Appl. No.: 09/329,261

(22) Filed: Jun. 28, 1999

Related U.S. Application Data

(63) Continuation of application No. PCT/NL98/00637, filed on Nov. 4, 1998.

(30) Foreign Application Priority Data

Nov. 7, 1997 (NL) .............................................. 1007487

(51) Int. Cl.$^7$ .............................................. A01B 79/00
(52) U.S. Cl. ........................... 172/2; 172/111; 172/123; 701/50
(58) Field of Search ............................... 701/50; 172/2, 172/6, 118, 123, 111

(56) References Cited

U.S. PATENT DOCUMENTS

| | | | | |
|---|---|---|---|---|
| 4,164,259 A | * | 8/1979 | van der Lely | 172/59 |
| 5,279,502 A | * | 1/1994 | Goughnour | 405/237 |
| 5,499,683 A | * | 3/1996 | Bassett | 172/4 |
| 5,751,576 A | * | 5/1998 | Monson | |
| 5,931,882 A | * | 8/1999 | Fick et al. | 701/50 |
| 5,961,573 A | * | 10/1999 | Hale et al. | 701/214 |
| 6,029,106 A | * | 2/2000 | Hale et al. | 701/50 |
| 6,141,614 A | * | 10/2000 | Janzen et al. | 701/50 |
| 6,199,000 B1 | * | 3/2001 | Keller et al. | 701/50 |

FOREIGN PATENT DOCUMENTS

| | | | |
|---|---|---|---|
| EP | 0208892 A2 | * | 6/1986 |
| EP | 0458107 A1 | * | 5/1991 |
| EP | 0749677 A1 | * | 12/1996 |
| EP | 0776598 A1 | * | 6/1997 |
| EP | 0838141 A2 | * | 4/1998 |
| GB | 2305045 A | * | 3/1997 |

* cited by examiner

*Primary Examiner*—Christopher J. Novosad
(74) *Attorney, Agent, or Firm*—Penrose Lucas Albright

(57) ABSTRACT

A method and apparatus for obtaining optimal cultivation of a parcel of land. A soil working machine with drivable working members, such as a rotary harrow, is provided with soil working members which rotate about approximately vertically orientated axes, and cooperates with a geographic positioning system such as DGPS, GPS, Lorean or a dead reckoning system to determine on a continual basis the actual position of the soil working machine on a parcel of land. Simultaneously, the condition or the composition or both of the underlying soil is determined and data of same is transmitted to a processing unit which maps the parcel of land into subareas wherein the states of the soil are the same. A control unit applies this mapping for controlling the soil working members during the soil working machine's operations so that each subarea of the same soil state is optimally cultivated. Variations in the cultivation are obtained by controlling the soil working members' rpm's or their working depths or both and also, optionally independently or in combination with other variations, controlling the soil working machine's speed as it transverses different subareas to optimize cultivation in each subarea. These variations in cultivation can occur during the mapping process or subsequently the mapping can be used for further cultivation operations of the same parcel of land.

23 Claims, No Drawings

MEANS FOR CONTROLLING A DRIVEN SOIL WORKING MACHINE ON THE BASIS OF INFORMATION DERIVED FROM A MAP

RELATED APPLICATION

This Application is a continuation of International Application No. PCT/NL98/00637, filed Nov. 4, 1998.

FIELD OF THE INVENTION

The invention relates to a soil working machine with drivable working members, in particular it relates to a rotary harrow provided with soil working members that are drivable about upwardly orientated axes.

BACKGROUND OF THE INVENTION

Such soil working machines are known. In case of a rotary harrow, the cultivation carried out by this machine is intended for the preparation of a seed-bed. When a large area of a parcel of land is worked, the composition, the compactness or the condition or a combination thereof of the soil may vary locally. For example, the soil of a certain subarea of a parcel may be more compacted than the remaining part of the parcel, or be composed of another type of soil, for example, more clay-like structure than the rest of the parcel, while another certain subarea may be more humid or more uneven than the remainder of the parcel. As a result thereof an uniform cultivation of the soil may not occur throughout the parcel, which may eventually result in a poor yield for certain areas.

SUMMARY OF THE INVENTION

A major object of the invention is to provide a soil working machine which automatically enables the parcel to be cultivated as uniformly as possible.

In accordance with the invention this is achieved in that the soil working machine is provided with a control system which is adapted to control automatically the revolutions per minute (rpm) or the working depth of the soil working members or the speed at which the soil working machine moves forwardly during operation based on signals supplied to the control system regarding the condition or the composition of the cultivator or both soil. For example, a signal transmitted to the control system from which signal there can be deduced that the machine is operating in an area where the soil is more compacted than in the rest of the parcel, then the speed at which the soil working machine moves forwards during operation is reduced automatically, so that the soil working members cultivate this subarea more intensively. In such situation the rpm of the soil working member may also be increased, possibly as an alternative, so that the same effect or an augmented effect is obtained. It is also possible to increase the working members working depth so that the soil is loosened to a greater depth.

According to an inventive feature, the control system comprises an rpm governor for regulating the working members' rpm, a height adjusting means for adjusting the working depth of the soil working members, a speed adjustment means for regulating the soil working machine's forward speeds or a combination of these components. According to an inventive feature, one or more soil working members can be provided with a separate rpm governor or a height adjusting means or both, which provide individual adjustment of the soil working members. In this manner it is also possible to cultivate the soil at different degrees of intensity over the working width of the machine.

In accordance with again another feature, soil analyses means is provided whereby the condition or the composition or both of the soil can be determined. Therefore the invention also relates to a soil working machine with drivable working members, in particular a rotary harrow with soil working members that are drivable about upwardly orientated shafts, characterized by the provision of soil analyses means for analyzing the condition or composition or both of the soil. In this manner, the condition or the composition or both of the soil can be determined on the spot during operation of the machine. According to the invention one or more torque sensors are also provided by means of which the torque of the working member is measured during operation. Signals from torque sensors can be used as information for the control system to vary the rpm or the working depth or both of the working members and the also relative to the machine's driving speed. If desired each of the soil working members may be provided with a separate torque sensor, or one torque sensor may be used for all the soil working members or for groups of soil working members. According to again another inventive feature, a processing unit is provided by means of which the signals supplied by the soil analyzing means are processed into a map of the surface cultivated by the soil working machine. This map can be recorded in a smart card or a floppy disc or a similar data carrier, which may be taken from the control system by the operator. The information stored therein can be used for working a parcel of land with a further agricultural machine. According to a further inventive feature, the processing unit is adapted to such divide the map into subareas having an approximately equal soil conditions or soil compositions or torque magnitudes, that is, equal resistance which the soil working machine encounters from the soil during operation.

According to another aspect of the invention, inputting means are provided with the aid of which a previously produced map of the soil to be cultivated by the soil working machine can be inputted into the control system. The inputting means can be disc-drive or a similar inputting device. According to an inventive feature, in this manner the control system can regulate automatically the rpm or the working depth or both of the soil working members and the driving speed of the soil working machine, on the basis of the information supplied by the inputted map.

In accordance with again another aspect of the invention, means are provided for determining the position the of the soil working machines on the parcel of land during operation. This may comprise a navigation system, such as DGPS, GPS, Lorean, dead reckoning, etc., or a combination of said systems. The actual position of the soil working machine as determined by a navigation system as well as the information from the map regarding the condition of the composition or both of the soil is supplied to the control system which, on the basis thereof, regulates automatically the rpm and the working depth, or either, of the soil working members, as well as the driving speed of the soil working machine. According to again another inventive feature, a visual display unit is provided showing the map during operation and the area in which the soil working machine is active. In the is manner the driver of the vehicle to which the soil working machine is coupled can determine in which subarea the machine is active. According to an aspect of the invention, the visual display unit is adapted to show the condition or the composition or both of the soil. This can be provided by representing various subareas in different colors or hatchings.

The invention can also be produced and sold separately, without being incorporated in a soil working machine. The invention thus relates to a control system, measuring means, a processing unit, an inputting means, means for determining the position, a visual display unit or any combination thereof that can be used in a soil working machine as described above.

The invention further comprises a method of regulating the rpm or the working depth or both, of drivable soil working members of a soil working machine, as well as the driving speed during operation of the soil working machine, once the position of the soil working machine on the parcel of land to be cultivated has been determined, on the basis of a previously produced map of the conditions or the compositions or both of the soil of the parcel of land to be cultivated, the rpm or the working depth or both of the soil working members as well as the driving speed of the soil working machine is adjusted automatically, to provide optimal soil cultivation by the soil working machine.

The invention yet further comprises a method of composing a map of a surface cultivated by a soil working machine with driven soil working members, in which method, once the position of the soil working machine is determined during operation of the soil working machine, signals from measured means regarding the condition or the composition or both of the soil are transmitted to a processing unit which processes these signals together with the actual position of the machine to provide a map of the cultivated surface.

Although we have described the preferred embodiments of our invention, it is to be understood that it is capable of other adaptations and modifications within the scope of the following claims.

Having disclosed our invention, what we claim as new and to be secured by Letters Patent of the United States of America is:

1. A soil working machine which comprises soil working members which rotate about upwardly orientated axes, a control system which controls the rpm of said soil working members, said control system comprising inputting means for receiving mapping of a parcel of land being worked by the soil working machine, said mapping comprising mapping of areas which have the same soil conditions in said parcel of land, geographic position determining means for continually determining the position of the soil working machine during operations, said control means controlling the rpm of said soil working members in accordance with the geographic position of the soil working machine on said parcel of land and soil conditions of the soil being worked by said soil working members so as to maximize the value of crop yield from the soil in the relevant area of said areas at said geographic position being worked by said soil working members.

2. A soil working machine in accordance with claim 1, wherein said control system comprises a rpm governor for regulating the number of revolutions per minute of said soil working members.

3. A soil working machine in accordance with claim 1, wherein said control system comprises a height adjusting means for adjusting the working depth of said soil working members.

4. A soil working machine in accordance with claim 1, wherein said control system comprises speed adjustment means for adjusting the forward speed of the soil working machine over the underlying soil.

5. A soil working machine in accordance with claim 1, wherein said control system comprises measuring means for measuring the composition of the soil to be worked.

6. A soil working machine in accordance with claim 1, wherein said control means comprises torque sensor which senses the torque to which at least one of said soil working members is subjected during operations.

7. A soil working machine in accordance with claim 1, wherein said geographic position determining means comprises a navigation system which consists of one or more of the following group of navigation systems: DGPS, GPS, Lorean and Dead Reckoning.

8. A soil working machine in accordance with claim 7, which comprises a visual display unit displaying a map showing the position of the soil working machine while it is active during its operations.

9. A soil working machine in accordance with claim 8, wherein said visual display unit shows differences in the state of the soil of the area in which the soil working machine is active during its operations.

10. A soil working machine which comprises soil working members which rotate about upwardly orientated axes, a control system which controls the rpm of said soil working members, said control system comprising mapping means for mapping the various soil conditions of a parcel of land being worked by the soil working machine, said mapping means comprising measuring means for measuring the state of the soil which is being worked by said soil working members in the course of the soil working machine's operations, geographic position determining means for continually determining the position of the soil working machine during operations, said control means controlling the rpm of said working members in accordance with the geographic position of the soil working machine on said parcel of land and the soil conditions of the soil being worked by said soil working members as measured by said measuring means so as to maximize the value of crop yield from the soil at said geographic position being worked by said soil working members.

11. A soil working machine in accordance with claim 10, wherein said measuring means comprises a torque sensor by means of which the torque sustained by said soil working members is measured during said operations.

12. A soil working machine in accordance with claim 10, wherein said mapping means comprises a processing unit, said measuring means transmitting signals to said processing unit, said processing unit processing said signals transmitted by said measuring means to produce a mapping of the conditions of the soil which is being worked by the soil working machine during said operations.

13. A soil working machine in accordance with claim 10, wherein said measuring means comprises torque sensors which measure the torque sustained by said soil working members during said operations, said measuring means comprising a processing unit by means of which signals transmitted by said sensor are processed into a mapping, said processing unit dividing said mapping into subareas which are identified as having approximately equal soil resistances which the soil working machine encounters from the soil during said operations based on the signals transmitted to said processing unit from said torque sensors.

14. A soil working machine in accordance with claim 13, wherein said mapping controls the soil working machine when it is used in further operations for working said parcel of land represented said mapping.

15. A soil working machine in accordance with claim 14, wherein said control system automatically regulates the rpm of said soil working members during said further operations based on information provided by said mapping.

16. A soil working machine in accordance with claim 14, wherein said control system automatically controls the depth of said soil working members during said further operations on the basis of information provided by said mapping.

17. A soil working machine in accordance with claim 14, wherein said control system controls the driving speed of the soil working machine during said further operations on said parcel of land on the basis of information provided by said mapping.

18. A method of regulating a soil working machine which is cultivating a parcel of land that comprises the steps of determining and recording the different states of the soil throughout said parcel of land and producing a mapping thereof which identifies areas for each different state of the soil of said differing states of the soil, cultivating said parcel of land by means of the soil working machine while continually determining the geographic position of the soil working machine on said parcel of land, inputting said mapping into the controls of the soil working machine and simultaneously coordinating the ongoing position of the soil working machine with the state of the particular soil which it is then working, and automatically controlling the soil working machine in accordance with the state of the particular soil in an area which it is then working as determined by said mapping to provide optimal cultivation of the soil which is being worked throughout said parcel of land by the soil working machine, said soil working members being rotated about substantially vertical axes and the automatic controlling of the soil working machine comprising governing the rpm of said working members.

19. A method in accordance with claim 18, comprising the further step of controlling the working depths of said soil working members.

20. A method in accordance with claim 18, which comprises the further step of controlling the driving speed of the soil working machine based on the state of the particular soil which the soil working machine is working at the relevant time.

21. A method of making a map of a parcel of land which is cultivated by a soil working machine having driven soil working members which are rotated about upwardly orientated axes, the method comprising continually determining the position of said soil working machine on said parcel of land while simultaneously cultivating the soil of said parcel of land with said soil working members and simultaneously determining the state of the soil which is being cultivated by measuring the torque required to rotate said soil working members about said upwardly orientated axes, transmitting data based on said determinations of the state of said soil to a processing unit, said processing unit processing said data in conjunction with information as to the actual position of said soil working machine and producing a map of the cultivated surface of said parcel of land which identifies subareas in said parcel of land wherein the state of the soil in each said subarea within said parcel of land is the same.

22. A method in accordance with claim 21, wherein said map is used to control the operations of said soil working members so that said soil working members rotate at substantially the same rpm in each said subarea of said parcel of land wherein the state of the soil therein is the same and said soil working members rotate at a different rpm's in different subareas of said parcel of land wherein the soil conditions are different from the soil conditions in said first mentioned subarea of said parcel of land, whereby optimal cultivation throughout said parcel of land is obtained although the state of soil is different in said different subareas of said parcel of land as related to said first mentioned subarea of said parcel of land.

23. A method in accordance with claim 21, which comprises the further step of controlling the speed of said soil working machine as it cultivates said parcel of land whereby said machine is caused to travel at a first predetermined speed when it is transversing said first mentioned subarea and to travel at a second predetermined speed when transversing a said different subarea, each of said speeds being an optimal speed for cultivating the respective subareas with said soil working members.

* * * * *